US012089202B2

(12) United States Patent
Sun et al.

(10) Patent No.: US 12,089,202 B2
(45) Date of Patent: Sep. 10, 2024

(54) METHOD AND APPARATUS FOR A SIDELINK TRANSMISSION

(71) Applicant: LENOVO (BEIJING) LIMITED, Beijing (CN)

(72) Inventors: Zhennian Sun, Beijing (CN); Xiaodong Yu, Beijing (CN); Haipeng Lei, Beijing (CN); Lianhai Wu, Beijing (CN); Hongmei Liu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 447 days.

(21) Appl. No.: 17/421,627

(22) PCT Filed: Jan. 8, 2019

(86) PCT No.: PCT/CN2019/070863
§ 371 (c)(1),
(2) Date: Jul. 8, 2021

(87) PCT Pub. No.: WO2020/142903
PCT Pub. Date: Jul. 16, 2020

(65) Prior Publication Data
US 2022/0078818 A1 Mar. 10, 2022

(51) Int. Cl.
*H04W 72/12* (2023.01)
*H04W 72/1263* (2023.01)
(Continued)

(52) U.S. Cl.
CPC ....... *H04W 72/1263* (2013.01); *H04W 72/21* (2023.01); *H04W 72/23* (2023.01); *H04W 72/542* (2023.01)

(58) Field of Classification Search
CPC . H04W 72/12; H04W 72/0446; H04W 4/021; H04W 72/23; H04W 72/20;
(Continued)

(56) References Cited

U.S. PATENT DOCUMENTS

2016/0338094 A1* 11/2016 Faurie ................ H04W 72/542
2018/0048994 A1* 2/2018 Kwon .................. H04W 4/021
(Continued)

FOREIGN PATENT DOCUMENTS

CN 106304351 A 1/2017
CN 106412794 A 2/2017
(Continued)

OTHER PUBLICATIONS

Internation Searching Authority, "Written Opinion of the International Searching Authority," PCT/CN2019/070863, Aug. 19, 2019, pp. 1-4.
(Continued)

*Primary Examiner* — Vinncelas Louis
(74) *Attorney, Agent, or Firm* — Kunzler Bean & Adamson

(57) ABSTRACT

The present application is related to a method performed by a user equipment (UE), wherein the method includes: transmitting, to a base station (BS), a request for one or more sidelink transmissions between the UE and one or more destinations; receiving scheduling information from the BS, wherein the scheduling information comprises an indicator indicating a grant for a selected sidelink transmission between a destination among the one or more destinations and the UE, and the scheduling information further comprises a resource which is scheduled for the UE to transmit data; and transmitting the data to the destination using the resource scheduled for the UE.

17 Claims, 8 Drawing Sheets

(51) Int. Cl.
  *H04W 72/21* (2023.01)
  *H04W 72/23* (2023.01)
  *H04W 72/542* (2023.01)

(58) Field of Classification Search
  CPC ........... H04W 72/542; H04W 72/1263; H04W 72/21; H04M 15/66; H04L 67/60; H04L 67/535
  See application file for complete search history.

(56) References Cited

U.S. PATENT DOCUMENTS

| | | | |
|---|---|---|---|
| 2018/0213438 A1* | 7/2018 | Muraoka | H04W 72/0446 |
| 2018/0295646 A1 | 10/2018 | Faurie et al. | |
| 2018/0332585 A1* | 11/2018 | Faurie | H04W 72/12 |
| 2021/0212104 A1* | 7/2021 | Li | H04W 72/23 |
| 2022/0007403 A1* | 1/2022 | Li | H04W 72/20 |
| 2022/0417802 A1* | 12/2022 | Ying | H04M 15/66 |

FOREIGN PATENT DOCUMENTS

| | | | |
|---|---|---|---|
| CN | 106717091 A | 5/2017 | |
| WO | 2017128275 A1 | 8/2017 | |
| WO | 2018204131 A1 | 11/2018 | |

OTHER PUBLICATIONS

CAICT, Considerations on Resource Allocation of NR V2X Sidelink, 3GPP TSG-RAN WG1 Meeting #94, R1-1809287, Aug. 20-24, 2018, pp. 1-6, Gothenburg, Sweden.

* cited by examiner

| Destination index | Destination ID |
|---|---|
| 0 | Destination ID of UE 203 |
| 1 | Destination ID of UE 204 |
| 2 | Destination ID of UE 205 |
| 3 | Destination Group ID of group 200a |
| 4 | Destination Group ID of group 200b |
| 5 | Destination ID of broadcast session 1# of group 200c |
| 6 | Reserved |
| 7 | Reserved |

FIG. 5

| Index | Destination index | LCG ID | Buffer Size | Note |
|---|---|---|---|---|
| 0 | 1 | 3 | Size 1 | TX UE to UE 203, Unicast session #1 |
| 1 | 2 | 3 | Size 2 | TX UE to UE 205, Unicast session #1, Unicast session #2 |
| 2 | 3 | 2 | Size 3 | TX UE to group 200a, Groupcast session #1 |
| 3 | 1 | 2 | Size 4 | TX UE to UE 203, Unicast session #2 |
| 4 | 5 | 2 | Size 5 | Broadcast session #1 of group 200c |
| 5 | 2 | 1 | Size 6 | TX UE to UE 205, Unicast session #3 |
| 6 | 4 | 0 | Size 7 | TX UE to group 200b, Groupcast session #1, Groupcast session #2 |
| 7 | 0 | 0 | Size 8 | TX UE to UE 204, Unicast session #1 |

FIG. 6

METHOD AND APPARATUS FOR A SIDELINK TRANSMISSION

TECHNICAL FIELD

The present application generally relates to sidelink communication, and more specifically relates to a scheduling grant for a sidelink transmission during sidelink communication.

BACKGROUND

Vehicle to everything (V2X) has been introduced into 5G wireless communication technology. Device-to-device (D2D) communication is applicable to public safety and commercial communication use-cases, and also to V2X scenarios. In terms of a channel structure of D2D communication, the direct link between two user equipments (UEs) is called a sidelink. Sidelink is a long-term evolution (LTE) feature introduced in 3GPP (3rd Generation Partnership Project) Release 12, and enables a direct communication between proximal UEs, and data does not need to go through a base station (BS) or core network.

In order to meet the requirements of providing relatively good performance on D2D communication, sidelink, or NR sidelink (e.g., advanced 3GPP NR (New radio) V2X service), communication techniques, e.g., sidelink unicast transmission, sidelink groupcast transmission, sidelink broadcast transmission, or the like, are developed.

SUMMARY

Some embodiments of the present application provide a method performed by a user equipment (UE). The method includes: transmitting, to a base station (BS), a request for one or more sidelink transmissions between the UE and one or more destinations; receiving scheduling information from the BS, wherein the scheduling information comprises an indicator indicating a grant for a selected sidelink transmission between a destination among the one or more destinations and the UE, and the scheduling information further comprises a resource which is scheduled for the UE to transmit data; and transmitting the data to the destination using the resource scheduled for the UE.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement a method performed by a UE for transmitting data.

Some embodiments of the present application provide a method performed by a base station. The method includes: receiving, from a user equipment (UE), a request for one or more sidelink transmissions between the UE and one or more destinations; selecting a sidelink transmission from the one or more sidelink transmissions, wherein the selected sidelink transmission is between a destination among the one or more destinations and the UE; and transmitting scheduling information, wherein the scheduling information comprises an indicator indicating a grant for the selected sidelink transmission, and the scheduling information further comprises a resource which is scheduled for the UE to transmit data.

Some embodiments of the present application also provide an apparatus. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement a method performed by a base station (BS).

BRIEF DESCRIPTION OF THE DRAWINGS

In order to describe the manner in which advantages and features of the present application can be obtained, a description of the present application is rendered by reference to specific embodiments thereof which are illustrated in the appended drawings. These drawings depict only exemplary embodiments of the present application and are not therefore to be considered as limiting of its scope.

FIG. 5 illustrates exemplary information transmitted during sidelink communication in accordance with some embodiments of the present application;

FIG. 6 illustrates exemplary information transmitted during sidelink communication in accordance with some embodiments of the present application;

DETAILED DESCRIPTION

Figure 1:
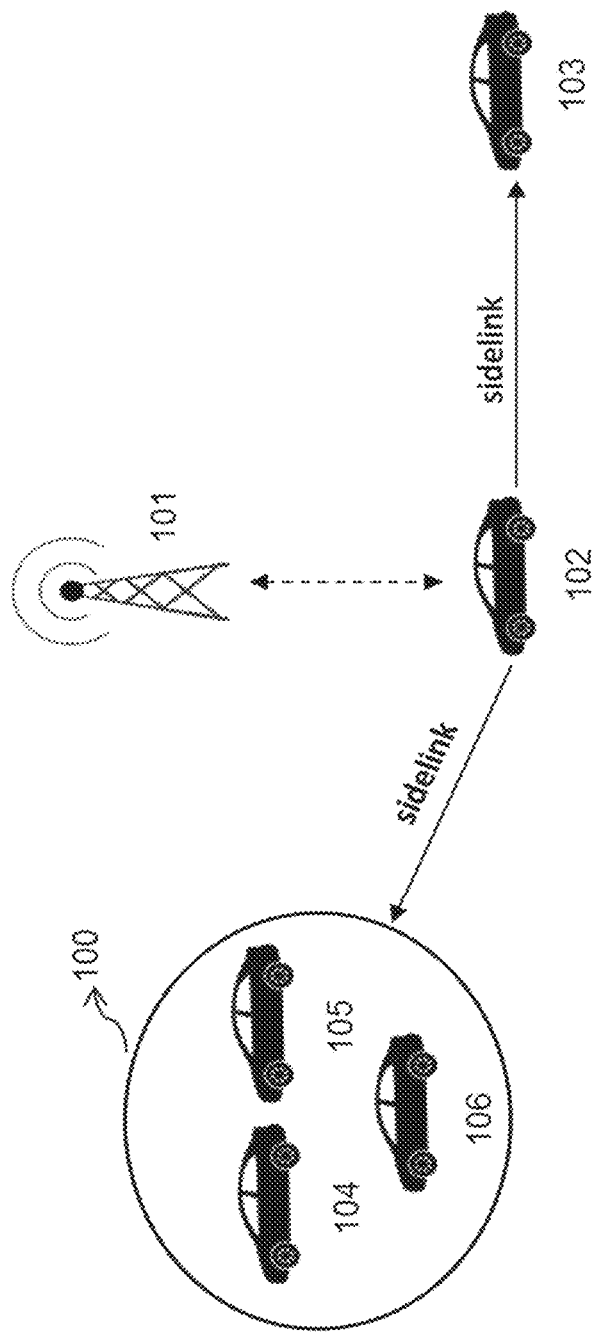
FIG. 1 illustrates an exemplary sidelink communication system in accordance with some embodiments of the present application.

The detailed description of the appended drawings is intended as a description of the currently preferred embodiments of the present application, and is not intended to represent the only form in which the present application may be practiced. It should be understood that the same or equivalent functions may be accomplished by different embodiments that are intended to be encompassed within the spirit and scope of the present application.

Sidelink (SL) communication includes groupcast communication, unicast communication, or broadcast communication. UE(s) under NR V2X scenario may be referred to as V2X UE(s).

A base station (BS) under NR V2X scenario may be referred to as an access point, an access terminal, a base, a base station, a macro cell, a Node-B, an enhanced Node B (eNB), a gNB, a Home Node-B, a relay node, a device, a remote unit, or by any other terminology used in the art. A BS may be distributed over a geographic region. Generally, a BS is a part of a radio access network that may include one or more controllers communicably coupled to one or more corresponding base stations.

A BS is generally communicably coupled to one or more packet core networks (PCN), which may be coupled to other networks, like the packet data network (PDN) (e.g., the Internet) and public switched telephone networks, among other networks. These and other elements of radio access and core networks are not illustrated but are well known generally by those having ordinary skill in the art. For example, one or more BSs may be communicably coupled to a mobility management entity (MME), a serving gateway (SGW), and/or a packet data network gateway (PGW).

A BS may serve a number of V2X UEs within a serving area, for example, a cell or a cell sector via a wireless communication link. A BS may communicate directly with one or more of V2X UEs via communication signals. For example, a BS may serve V2X UEs within a macro cell.

A BS transmits downlink (DL) communication signals to serve a V2X UE in time domain, frequency domain, and/or spatial domain. Furthermore, the DL communication signals may be carried over wireless communication links. The wireless communication links may be any suitable carrier in licensed or unlicensed radio spectrum. The wireless communication links facilitate communication between the V2X UEs and the BS.

Currently, an agreement of 3GPP RAN1 on SL communication is made for supporting several sidelink resource allocation modes for V2X sidelink communication. A sidelink transmission resource(s) may be a time resource, a frequency resource, a spatial resource, or a combination thereof. In a sidelink resource allocation mode, a BS schedules resource(s) for a V2X UE within an SL communication system. In order to allocate or assign resource(s), a BS may allocate or assign specific sidelink resource(s) for sidelink groupcast communication, sidelink unicast communication, or sidelink broadcast communication.

A V2X UE, which transmits data according to sidelink resource(s) scheduled by a BS, may be referred to as a UE for transmitting, a transmitting UE, a transmitting V2X UE, a Tx UE, a V2X Tx UE, or the like. A V2X UE, which receives data according to sidelink resource(s) scheduled by a BS, may be referred to as a UE for receiving, a receiving UE, a receiving V2X UE, a Rx UE, a V2X Rx UE, or the like.

In an SL communication system in which a BS schedules sidelink resource(s), some issues need to be solved: behaviors of a BS and V2X UEs, a signaling transmission mechanism between a BS and V2X UEs, and a resource allocation mechanism for V2X UEs.

Some embodiments of the present application provide a mechanism for scheduling sidelink transmission resource(s). Some embodiments of the present application provide a mechanism for transmitting data according to scheduled sidelink transmission resource(s). Some embodiments of the present application provide an apparatus for scheduling sidelink transmission resource(s). Some embodiments of the present application provide an apparatus for transmitting data according to scheduled sidelink transmission resource(s).

Embodiments of the present application define specific behaviors of a BS and implement an efficient signaling transmission mechanism for Tx UEs. Embodiments of the present application may avoid a half-duplex issue, an interference issue, a beam coordination issue, or a combination thereof during sidelink communication. Moreover, embodiments of the present application may implement an efficient feedback mechanism (e.g., HARQ feedback) corresponding to the transmitted data between a BS and a UE.

Embodiments of the present application may be provided in a network architecture that adopts various service scenarios, for example but is not limited to, 3GPP 3G, long-term evolution (LTE), LTE-Advanced (LTE-A), 3GPP 4G, 3GPP 5G NR (new radio), 3GPP LTE Release 12 and onwards, etc. It is contemplated that along with the 3GPP and related communication technology development, the terminologies recited in the present application may change, which should not affect the principle of the present application.

FIG. 1 illustrates an exemplary sidelink communication system in accordance with some embodiments of the present application. As shown in FIG. 1, the sidelink communication system includes a base station, i.e., BS 101, and some UEs, i.e., UE 102, UE 103, UE 104, UE 105, and UE 106. UE 102, UE 103, UE 104, UE 105, and UE 106 may be configured to sidelink unicast transmission, perform sidelink groupcast transmission, or sidelink broadcast transmission. For example, UE 102 functions as a Tx UE. UE 102 may transmit information to BS 101 and receive control information from BS 101. UE 102 may transmit information or data to other UE(s) within the sidelink communication system, through sidelink unicast, sidelink groupcast, or sidelink broadcast.

It is contemplated that, in accordance with some other embodiments of the present application, a sidelink communication system may include more or fewer BSs, more or fewer UEs, more or fewer UE groupcast groups, and more or fewer UE broadcast groups; and moreover, a UE groupcast group or a UE broadcast group may include different numbers of UEs at different time, along with joining and leaving of UE(s) during sidelink communication. It is contemplated that, in accordance with some other embodiments of the present application, names of UEs (which represent a Tx UE, a Rx UE, and etc.) shown in FIG. 1 may be different, e.g., UE 117, UE 118, and UE 119 or the like. Moreover, although each UE shown in FIG. 1 is illustrated in the shape of a car, it is contemplated that a sidelink communication system may include any type of UE (e.g., a roadmap device, a cell phone, a computer, a laptop, IoT (internet of things) device or other type of device) in accordance with some other embodiments of the present application. Each of FIGS. 2 and 7-9 in the present application has the same characteristics as those of FIG. 1.

A Tx UE in a sidelink communication system may transmit information or data to other UE(s) in the sidelink communication system in a unicast session. A unicast session may be referred to as a sidelink unicast session.

Two or more UEs in a sidelink communication system may form UE group(s) during sidelink communication. A group of UEs may be configured to perform a sidelink groupcast transmission in a groupcast session. A group of UEs performing a sidelink groupcast transmission may be referred to as a groupcast group of UEs, a sidelink groupcast group of UEs, a UE groupcast group, a UE sidelink groupcast group, or the like. A groupcast session may be referred to as a sidelink groupcast session. In a groupcast session, a Tx UE within a groupcast group may transmit a groupcast message or a groupcast packet to all Rx UE(s) within the same groupcast group. The Tx UE within a groupcast group may be referred to as a source UE. Rx UE(s) within a groupcast group may be referred to as member UE(s). In a groupcast session, some or all member UE(s) may receive the groupcast message (packet) from a source UE. A groupcast message may include groupcast data.

A Tx UE may transmit data to a group of UEs through sidelink broadcast communication in a broadcast session. The group of UEs for receiving data from a Tx UE by sidelink broadcast may be referred to as a broadcast receiving group, a receiving group of broadcast, or the like. A broadcast session may be referred to as a sidelink broadcast session.

According to the embodiments of FIG. 1, UE 102 functions as a Tx UE. For instance, UE 102 transmits data to UE 103 in a sidelink unicast session. UE 104, UE 105, and UE 106 form a group of Rx UEs, i.e., receiving group 100, and UE 102 transmits data to all UEs in receiving group 100. If UE 102 transmits data to UEs in receiving group 100 by sidelink groupcast transmission, UE 102, UE 104, UE 105, and UE 106 together form a sidelink groupcast group; wherein UE 102 functions as a source UE, all of UE 104, UE 105, and UE 106 function as member UEs, and UE 102 transmits data to UE 104, UE 105, and UE 106 in a sidelink groupcast session. If UE 102 transmits data to UEs in receiving group 100 by sidelink broadcast transmission, UE 102 transmits data to UE 104, UE 105, and UE 106 in a sidelink broadcast session.

Figure 2:
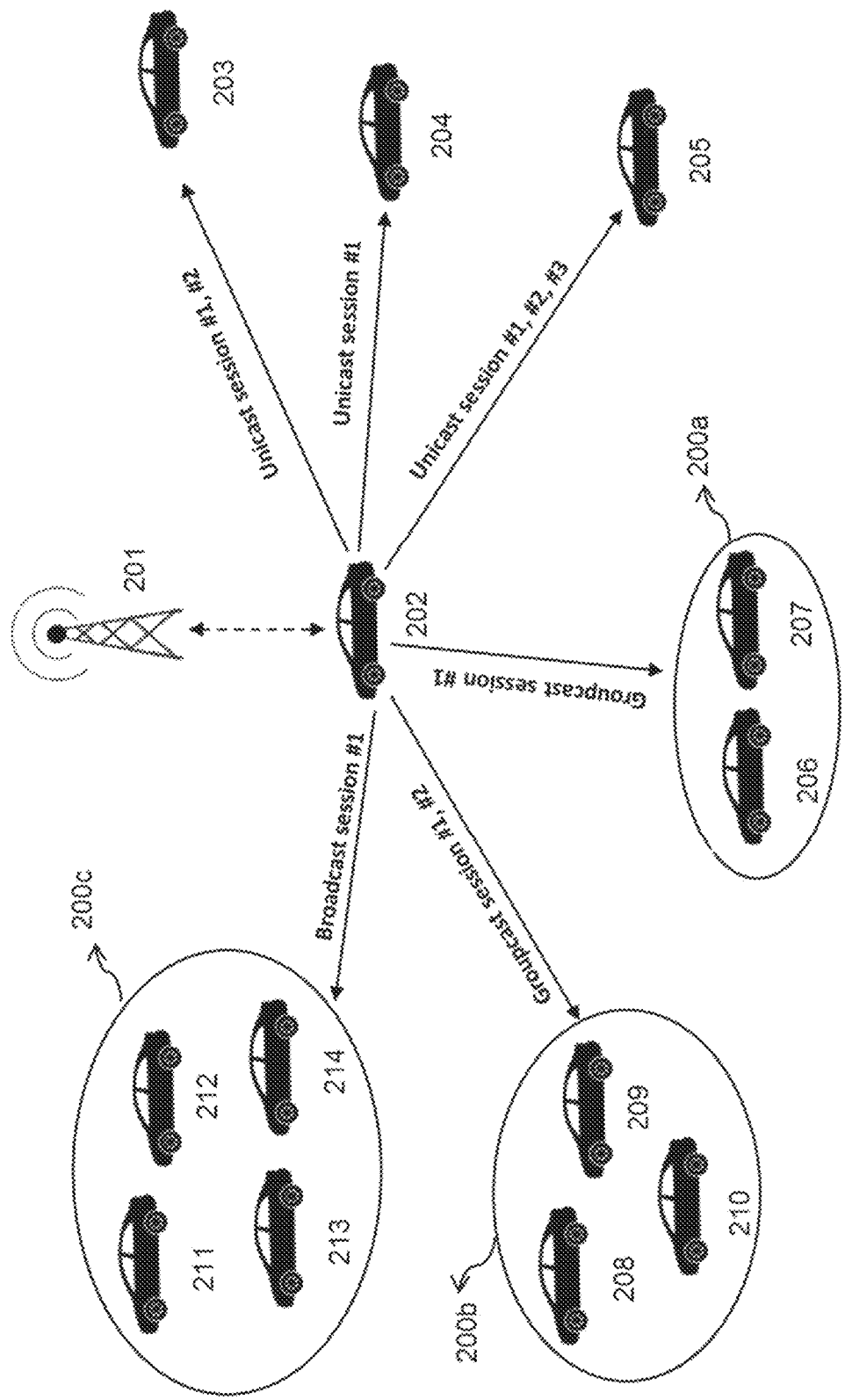
FIG. 2 illustrates another exemplary sidelink communication system in accordance with some embodiments of the present application.

FIG. 2 illustrates another exemplary sidelink communication system in accordance with some embodiments of the present application. Similar to FIG. 1, the sidelink communication transmission implemented in the embodiments of FIG. 2 includes unicast transmission, groupcast transmission, and broadcast transmission; and the total number of BSs, the total number of UEs, and names of UEs (which represent a Tx UE or a Rx UE) shown in FIG. 2 may vary.

According to the embodiments of FIG. 2, BS 201 represents a base station, UE 202 represents a Tx UE, and other UEs represent Rx UEs. Each of UE 203, UE 204, and UE 205 represents Rx UEs for unicast transmission; UE 206 and UE 207 represent Rx UEs for groupcast transmission; UE 208, UE 209, and UE 210 represent Rx UEs for groupcast transmission; and UE 211, UE 212, UE 213, and UE 214 represent Rx UEs for broadcast transmission.

Specifically, UE 202, which functions as a Tx UE, transmits control information to BS 201 and receives control information from BS 201. UE 202 transmits data to each of UE 203, UE 204, and UE 205 through a sidelink unicast session. UE 206 and UE 207 form a group of Rx UEs, i.e., receiving group 200a. UE 208, UE 209, and UE 210 form a group of Rx UEs, i.e., receiving group 200b. UE 202 transmits data to all UEs in receiving group 200a and receiving group 200b through a sidelink groupcast session. UE 211, UE 212, UE 213, and UE 214 form a group of Rx UEs, i.e., receiving group 200c. UE 102 transmits data to UEs in receiving group 200c through a sidelink broadcast session.

More specifically, as shown in FIG. 2, UE 202 transmits data to UE 203 in Unicast session #1 and Unicast session #2, respectively. UE 202 transmits data to UE 204 in Unicast session #1. UE 202 transmits data to UE 205 in Unicast session #1, Unicast session #2, and Unicast session #3, respectively. UE 202 transmits data to UE 206 and UE 207 within receiving group 200a in Groupcast session #1. UE 202 transmits data to UE 208, UE 209, and UE 210 within receiving group 200b in Groupcast session #1 and Groupcast session #2, respectively. UE 202 transmits data to UE 211, UE 212, UE 213, and UE 214 within receiving group 200c in Broadcast session #1.

Figure 3:
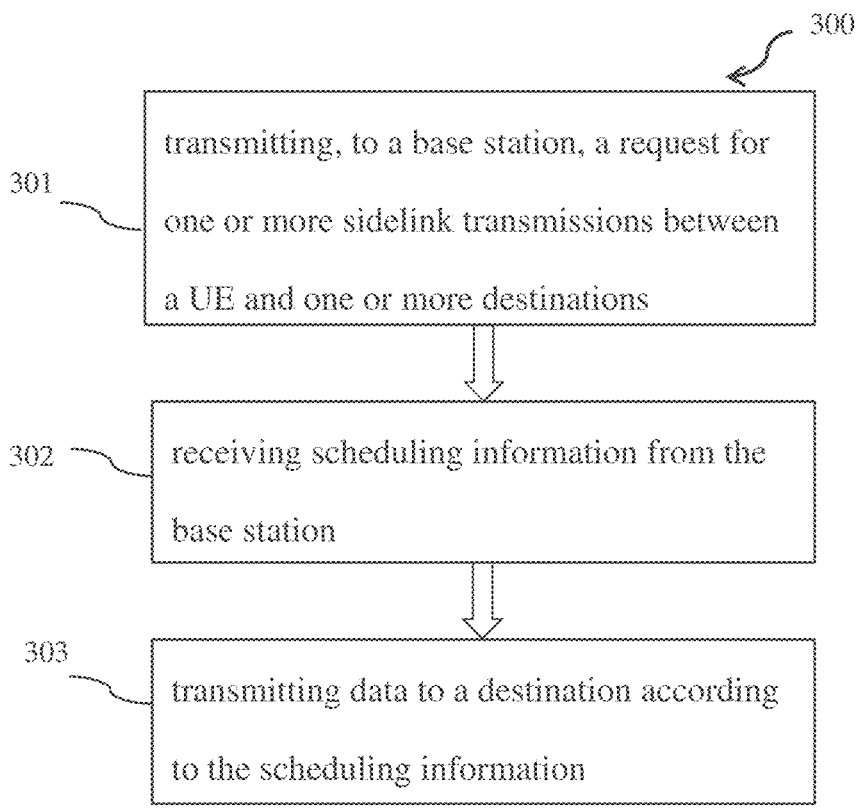
FIG. 3 illustrates a flow chart of a method for transmitting data in accordance with some embodiments of the present application.

FIG. 3 illustrates a flow chart of a method for transmitting data in accordance with some embodiments of the present application. Referring to FIG. 3, method 300 is performed by a Tx UE (e.g., UE 102 or UE 202 as illustrated and described with reference to FIG. 1 or FIG. 2, respectively) in some embodiments of the present application.

In operation 301, a Tx UE transmits, to a base station, a request for one or more sidelink transmissions between the Tx UE and one or more destinations. In operation 302, the Tx UE receives scheduling information from the base station. In operation 303, the Tx UE transmits data to a destination according to the scheduling information.

In some embodiments of the present application, in the case that a Tx UE aims to transmit data to destination(s) in the sidelink communication system, the Tx UE transmits, to a BS, information (e.g., a request for sidelink transmission(s)) including a list of destination ID(s) of sidelink transmission(s) between the Tx UE and the destination(s). A BS may obtain destination ID(s) of destination(s) from information transmitted by the Tx UE, decide to grant which sidelink transmission(s) of a destination, and then schedule resource(s) to the granted sidelink transmission(s).

Since a sidelink communication system may perform groupcast communication, unicast communication, or broadcast communication, in some embodiments of the present application, a Tx UE may further indicate a specific communication type of a sidelink transmission(s) to a BS for assigning resource(s). For instance, based on different communication types between a Tx UE and a destination, destination ID(s) may be a UE ID of a sidelink unicast transmission, a group ID of a sidelink groupcast group, or a sidelink broadcast session ID.

After receiving a request for sidelink transmission(s) from a Tx UE, a BS decides, according to the specific communication type and other actual conditions or factors, to grant which sidelink communication type and which sidelink transmission(s), and then schedules resource(s) to the granted specific sidelink transmission(s). After scheduling or assigning resource(s) for the granted specific sidelink transmission(s), the BS generates the corresponding scheduling information, and transmits the scheduling information to the Tx UE. According to the scheduling information received from the BS, the Tx UE may perform the granted specific sidelink transmission(s) and send data to the destination(s) using the resource(s) assigned by the BS.

Figure 4:
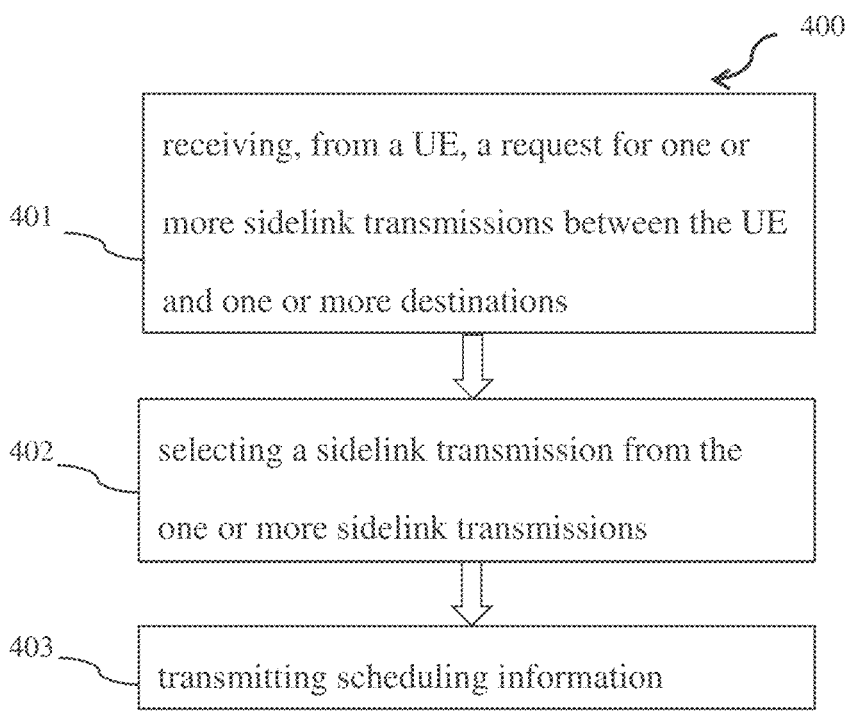
FIG. 4 illustrates a flow chart of a method for scheduling resource in accordance with some embodiments of the present application.

FIG. 4 illustrates a flow chart of a method for scheduling resource in accordance with some embodiments of the present application. Referring to FIG. 4, method 400 is performed by a BS (e.g., BS 101 or BS 201 as illustrated and described with reference to FIG. 1 or FIG. 2, respectively) in some embodiments of the present application.

In operation 401, a BS receives, from a UE, a request for one or more sidelink transmissions between the UE and one or more destinations. In operation 402, the BS selects a sidelink transmission from the one or more sidelink transmissions. In operation 403, the BS transmits scheduling information.

In some embodiments of the present application, a BS determines or generates scheduling information according to information received from a UE. In some embodiments of the present application, scheduling information is determined or generated based on quality of service (QoS) of one or more sidelink transmissions between a Tx UE and one or more destinations (e.g., one or more Rx UEs). A BS may transmit scheduling information in various manners or formats. For instance, a BS transmits downlink control information (DCI) carrying scheduling information to a Tx UE.

The scheduling information may include a sidelink transmission resource which is scheduled by a BS for the granted sidelink transmission between a Tx UE and a destination. A sidelink transmission resource scheduled by a BS may be a time resource, a frequency resource, a spatial resource, or a combination thereof. In some embodiments of the present application, a sidelink transmission resource(s) is a mini-slot for a sidelink transmission.

The scheduling information may indicate a grant for a sidelink transmission between a destination among one or more destinations and a Tx UE. For example, the scheduling information includes an indicator indicating a grant for a specific sidelink transmission.

FIG. 5 illustrates exemplary information transmitted during sidelink communication in accordance with some embodiments of the present application. FIG. 5 shows an exemplary table of destination ID(s) of destination(s) of sidelink transmission(s). As shown in FIG. 5, the table includes two columns: Destination index and Destination ID. The first column represents an index of each destination ID in the table and is used to retrieve a specific destination ID from the table. The second column represents identifiers of each reception for a sidelink transmission of a Tx UE. The table shown in FIG. 5 includes eight rows of data, i.e., Destination IDs in index 0 to index 7, wherein index 6 and index 7 do not include concrete Destination IDs and are reserved.

It is contemplated that, in accordance with some other embodiments of the present application, the table shown in FIG. 5 may include more or fewer columns and more or fewer rows of data. For example, a table of destination ID(s) of destination(s) of sidelink transmission(s) includes sixteen rows of data, wherein ten rows are actual Destination IDs, while other six rows are reserved.

Please refer to FIG. 2 along with FIG. 5. Based on different communication types between UE 202 and Rx UEs in the sidelink communication system of FIG. 2, Destination IDs in FIG. 5 include a UE ID of a sidelink unicast transmission, a group ID of a sidelink groupcast group, and a sidelink broadcast session ID. Specifically, index 0, index 1, and index 2 within FIG. 5 correspond to Destination ID of UE 203, Destination ID of UE 204, and Destination ID of UE 205, respectively; index 3 and index 4 within FIG. 5 correspond to Destination Group ID of group 200*a* and Destination Group ID of group 200*b*, respectively; and index 5 within FIG. 5 correspond to Destination ID of broadcast session 1 # of group 200*c*.

In some embodiments of the present application, a Tx UE (e.g., UE 202 as shown in FIG. 2) merely transmits concrete Destination ID(s) (e.g., data of six rows with index 0 to index 5 in the second column in FIG. 5) to a BS, but does not transmit index value(s) (e.g., index 0 to index 5 in the first column in FIG. 5) corresponding to concrete Destination ID(s) to the BS. In other words, a Tx UE merely transmits a list of Destination ID(s) for of destination(s) of sidelink transmission(s), but does not transmit any corresponding index value(s). After sequentially receiving concrete Destination ID(s) from a Tx UE, a BS has the same knowledge about the index value(s) corresponding to the concrete Destination ID(s) as the Tx UE. Accordingly, once a BS transmits an index value, after receiving the index value from the BS, a Tx UE may retrieve and determine the concrete Destination ID corresponding to the index value. Such mechanism may save payload size and enhance communication efficiency during sidelink communication.

Destination ID(s) in a sidelink communication system may vary at different time, along with joining and leaving of UE(s) during sidelink communication. If a Tx UE aims to perform sidelink communication to current destination(s), the Tx UE needs to report an updated list of Destination ID(s) of destination(s) to a BS, in order to request the scheduling information of the BS.

After receiving a list or an updated list of Destination ID(s) of destination(s) from a Tx UE, a BS selects a specific sidelink transmission from sidelink transmission(s) between the Destination ID(s) and the Tx UE. Then, the BS allocates a sidelink resource(s) for the selected sidelink transmission, generates scheduling information, and transmits the scheduling information to the Tx UE.

In some embodiments of the present application, the scheduling information includes the sidelink resource(s) allocated by the BS, and further includes concrete Destination ID(s) of the selected sidelink transmission. In other words, a BS explicitly indicates Destination ID(s) of a granted sidelink transmission in the scheduling information. Based on such scheduling information received from the BS, a Tx UE knows which sidelink transmission is granted by the BS, and will send data to a destination having the concrete Destination ID using sidelink resource(s) that is allocated by the BS and included in the scheduling information. For instance, in one payload format, if a total length of scheduling information is M bits (e.g., 48 bits), whereas the length of Destination ID is N bits (e.g., 24 bits), the scheduling information will use N bits to carry a concrete Destination ID and use L bits (e.g., 12 bits) to carry the allocated sidelink resource(s) for the concrete Destination ID, and the remaining (M-N-L) bits (e.g., 12 bits) are used to indicate other information for sidelink transmission.

In some embodiments of the present application, the scheduling information includes the sidelink resource(s) allocated by the BS, and further includes an indicator indicating an index value corresponding to Destination ID(s) of the selected sidelink transmission. In other words, a BS implicitly indicates Destination ID(s) of a granted sidelink transmission in the scheduling information. Based on such scheduling information received from the BS, a Tx UE may use the index value included in the scheduling information to retrieve Destination ID of the sidelink transmission selected by the BS. Thus, the Tx UE knows which sidelink transmission is granted by the BS, and will send data to the destination having the retrieved Destination ID using sidelink resource(s) that is allocated by the BS and included in the scheduling information.

According to the embodiments of FIG. 2, after receiving a list of Destination ID(s) of destination(s) from UE 202, BS 201 selects a sidelink groupcast transmission for group 200*a*, i.e., sidelink transmission from UE 202 to UE 206 and UE 207. Then, BS 201 allocates sidelink resource(s) for the sidelink groupcast transmission for group 200*a*, generates scheduling information, and transmits the scheduling information to UE 202, wherein the scheduling information includes at least the allocated sidelink resource(s) and an indicator indicating index 3. Based on index 3 in the scheduling information received from BS 201, UE 202 may obtain Destination Group ID of group 200*a* by retrieving the mapping table between index values and Destination ID(s). Then, UE 202 knows that BS 201 grants the sidelink groupcast transmission for group 200*a*, and will send data to UE 206 and UE 207 within group 200*a* using sidelink resource(s) that is allocated by BS 201 and included in the scheduling information.

In some embodiments of the present application, if there are multiple sidelink sessions between a TX UE and granted Rx UE(s), the TX UE determines which session will be transmitted on the sidelink resource(s) allocated by a BS.

According to the embodiments of FIG. 2, in the case that BS 201 selects a sidelink groupcast transmission for group 200*b*, i.e., sidelink transmission from UE 202 to UE 208, UE 209, and UE 210. Then, BS 201 allocates sidelink resource(s) for the sidelink groupcast transmission for group 200*b*, and generates and transmits scheduling information including at least the allocated sidelink resource(s) and an indicator indicating index 4. Based on index 4 in the scheduling information received from BS 201, UE 202 may obtain Destination Group ID of group 200*b* by retrieving the mapping table between index values and Destination ID(s). Then, UE 202 knows that BS 201 grants the sidelink groupcast transmission for group 200*b*. Since there are two groupcast sessions between UE 202 and group 200*b*, i.e., Groupcast session #1 and Groupcast session #2 as shown in FIG. 2, UE 202 may determine which session on the sidelink resource(s) allocated by BS 201 to perform and then transmit data on the determined session.

For example, in one payload format, if a total length of scheduling information is M bits (e.g., 28 bits), the scheduling information may use N bits (e.g., 4 bits) to carry an indicator indicating an index value and use L bits (e.g., 12 bits) to carry the allocated sidelink resource(s) for the selected sidelink transmission, at the remaining (M-N-L) bits (e.g., 12 bits) are used to indicate other information for sidelink transmission. With the length of 4 bits, the indicator in the scheduling information may carry 16 index values in maximum, e.g., index 0 to index 15, and may correspond to 16 rows of Destination ID(s) in the table as shown in FIG. 5.

FIG. 6 illustrates exemplary information transmitted during sidelink communication in accordance with some embodiments of the present application. FIG. 6 shows an exemplary table of a buffer size report (BSR) for sidelink transmission(s). Similar to FIG. 5, the table shown in FIG. 6 may include more or fewer columns and more or fewer rows of data.

Please refer to FIGS. 2 and 5 along with FIG. 6. As shown in FIG. 6, the table includes five columns: Index, Destination Index, LCG (logical channel group) ID, Buffer Size, and Note. The first column represents an index of each row in the table of FIG. 6 and is used to retrieve specific data from the table. For each row in the table of FIG. 6, the second column represents an index value of Destination Index, that completely corresponds to the Destination Index in the exemplary table of destination ID(s) of FIG. 5, and is used to retrieve Destination ID of a specific destination from the table of FIG. 5; the third column represents LCG ID corresponding to the specific destination of the same row in the table of FIG. 6; the fourth column represents a buffer size corresponding to the specific destination of the same row in the table of FIG. 6; and the fifth column represents information related to the specific destination and sidelink session of the same row in the table of FIG. 6. As shown in the fourth column "Buffer Size," Size 1, Size 2, Size 3, Size 4, Size 5, Size 6, Size 7, and Size 8 are merely exemplary, and each of Size 1 to Size 8 represents a specific buffer size value in actual sidelink transmissions.

In some embodiments of the present application, a Tx UE (e.g., UE 202 as shown in FIG. 2) merely transmits data of BSR (i.e., the second, third, and fourth columns in FIG. 6) to a BS, but does not transmit value(s) of Index (i.e., the first column in FIG. 6) and contents of Note (i.e., the fifth column in FIG. 6) to the BS. In other words, a Tx UE merely transmits each element of BSR for sidelink transmission(s), but does not transmit any index value(s) or related note information. After sequentially receiving concrete element(s) of BSR from a Tx UE, a BS has the same knowledge about the index value(s) corresponding to the concrete element(s) of BSR as those of the Tx UE. On the basis of the same knowledge, once receiving an index value of a BSR element of from a BS, a Tx UE may retrieve and determine the concrete BSR element corresponding to the index value, and may determine note information related to the concrete BSR element. As can be seen, such mechanism merely transmits an index value, but does not transmit any data of a BSR element, which may save payload size and thus enhance communication efficiency during sidelink communication.

In some embodiments of the present application, a Tx UE (e.g., UE 202 as shown in FIG. 2) transmits both concrete Destination ID(s) (e.g., data in the second column in FIG. 5) and BSR element(s) (e.g., data in the second, third, and fourth columns in FIG. 6) to a BS. Based on the received Destination ID(s) and BSR element(s), the BS has the same knowledge about Destination Index value(s) corresponding to the concrete Destination ID(s) in FIG. 5 as those of the Tx UE, and has the same knowledge about the index value(s) corresponding to BSR element(s) in FIG. 6 as those of the Tx UE. Accordingly, after considering all data in the received Destination ID(s) and BSR element(s), the BS may schedule resource(s) to a concrete destination and then only transmits, to the Tx UE, an index value in BSR element(s) which corresponds to the concrete destination.

For example, Destination ID of Destination Group ID of receiving group 200*b* has Destination index value 4 as shown in FIG. 5, while Destination index value 4 is listed in the second column and the seventh row with Index value 6 in FIG. 6; and Index value 6 represents LCG ID value 0, Buffer Size value "Size 7," and transmissions from TX UE to group 200*b*, including both Groupcast session #1 and Groupcast session #2. If a BS schedules resource(s) for UEs in receiving group 200*b*, the BS may merely transmit Index value 6 as well the scheduled resource(s) to a Tx UE; based on Index value 6, the Tx UE may retrieve, from FIG. 6, Destination index value 4, LCG ID value 0, Buffer Size value "Size 7," and note information "TX UE to group 200*b*, Groupcast session #1, Groupcast session #2"; then, based on the Destination index value 4, the Tx UE may retrieve, from FIG. 5, Destination ID of Destination Group ID of receiving group 200*b*. Since there are two sessions between transmissions from TX UE to group 200*b*, i.e., Groupcast session #1, Groupcast session #2, the TX UE may determine transmitting data in which session using the scheduled resource(s). As can be seen, such mechanism merely transmits an index value, but does not transmit any data of a BSR element or any destination ID, which may save payload size and thus enhance communication efficiency during sidelink communication.

Figure 7:
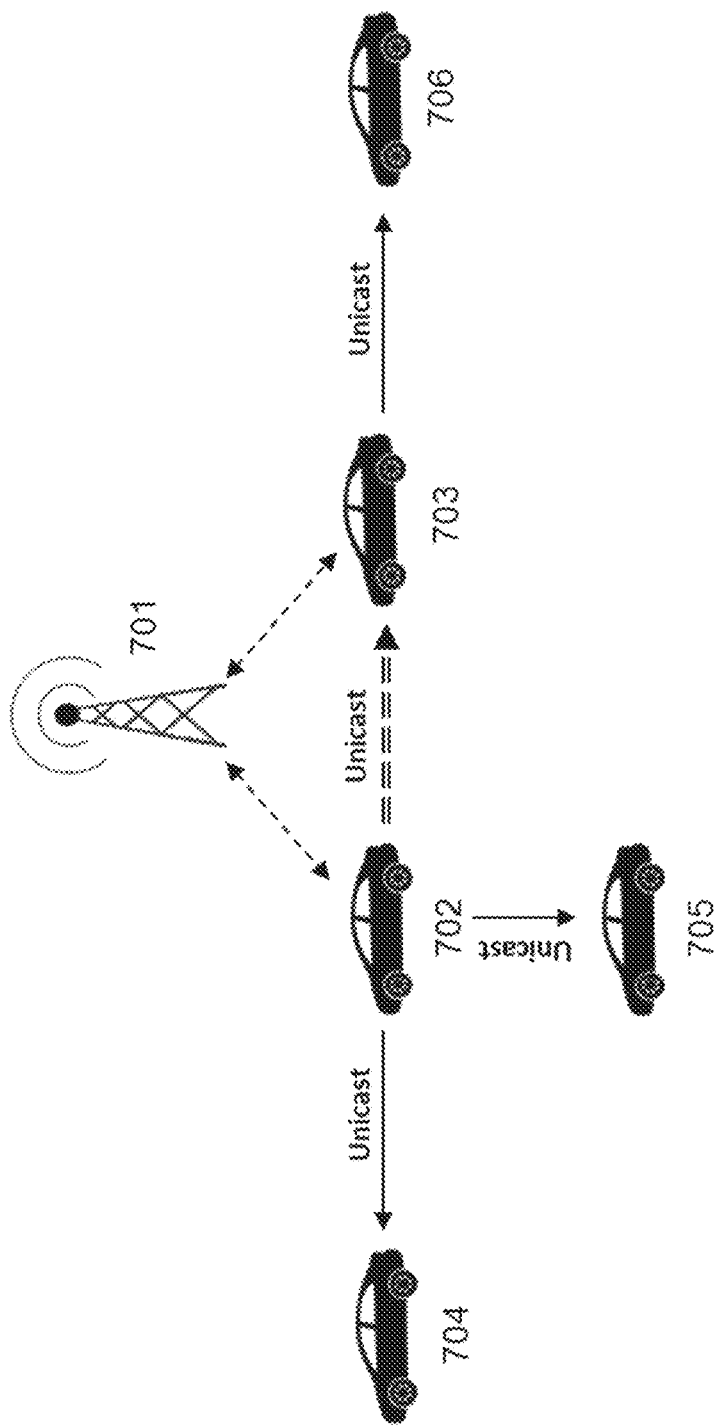
FIG. 7 illustrates an exemplary sidelink communication system in accordance with some embodiments of the present application.

FIG. 7 illustrates an exemplary sidelink communication system in accordance with some embodiments of the present application. Similar to FIGS. 1 and 2, the total number of BSs, the total number of UEs, and names of UEs (which represent a Tx UE or a Rx UE) shown in FIG. 7 may vary. According to the embodiments of FIG. 7, BS 701 represents a base station; UE 702 represents a Tx UE, while UE 703, UE 704, and UE 705 represent Rx UEs for unicast transmissions; and UE 703 represents a Tx UE, while UE 706 represents a Rx UE for a unicast transmission.

In some embodiments of the present application, the sidelink communication transmission implemented in the embodiments of FIG. 7 may avoid half-duplex collision issue. Specifically, if UE 703 functions as a Tx UE and performs transmission for UE 706, whereas UE 702 functions as a Tx UE and performs the unicast transmission to UE 703 at the same time, a half-duplex collision issue occurs at UE 703, because the unicast transmission between UE 702 and UE 703 requires UE 703 to function as a Rx UE. However, the half-duplex collision issue may be avoided using the embodiments illustrated in FIGS. 3-6, in which a BS knows global transmission information received from all UEs in a sidelink communication system (e.g., both UE 702 and UE 703), determines Rx UE(s) or sidelink sessions according to actual conditions, and uniformly schedules resource(s) for the Rx UE(s).

For instance, BS 701 may firstly schedule resource(s) for unicast transmission from UE 702 to UE 703, and secondly schedule resource(s) for unicast transmission from UE 703 to UE 706. In other words, sidelink transmissions between UEs in a sidelink communication system are controlled by a BS in the sidelink communication system, and thus the half-duplex collision issue is avoided.

Figure 8:
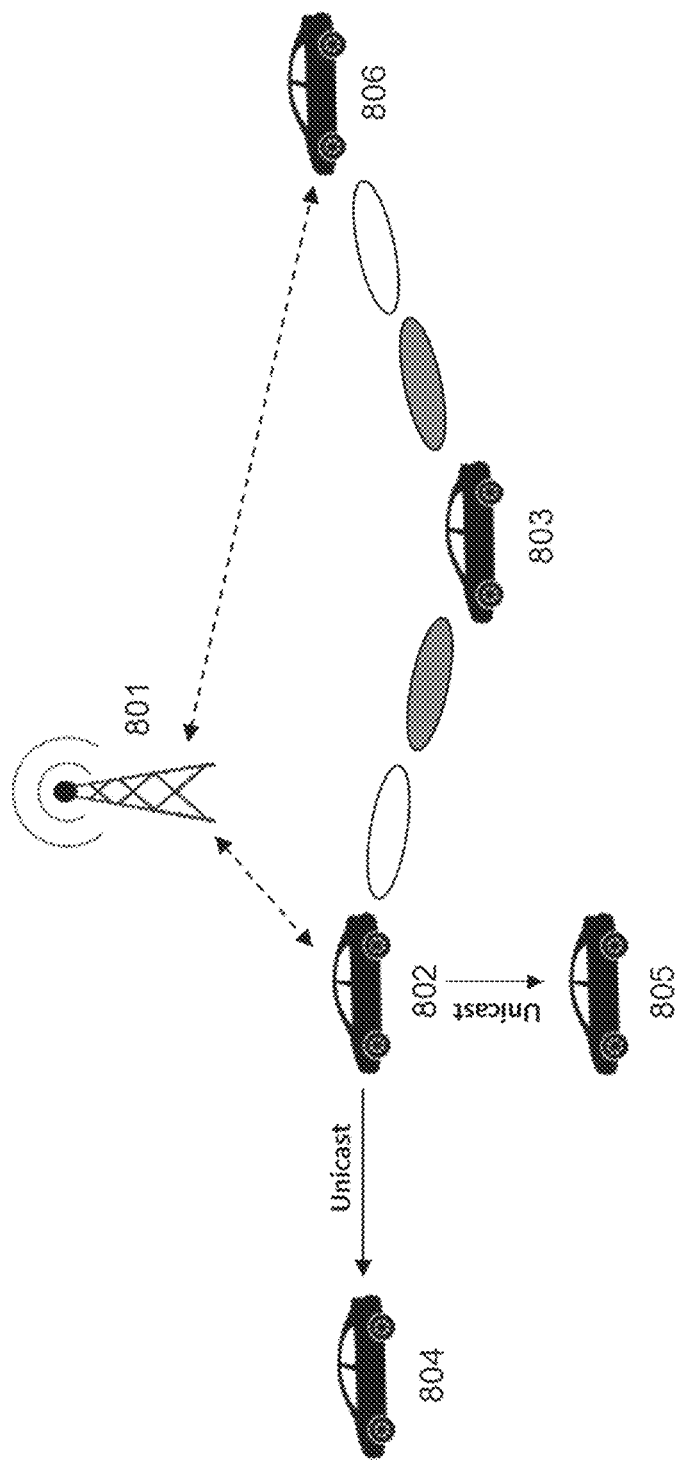
FIG. 8 illustrates another exemplary sidelink communication system in accordance with some embodiments of the present application.

FIG. 8 illustrates another exemplary sidelink communication system in accordance with some embodiments of the present application. Similar to FIGS. 1, 2, and 7, the total number of BSs, the total number of UEs, and names of UEs (which represent a Tx UE or a Rx UE) shown in FIG. 8 may vary. According to the embodiments of FIG. 8, BS 801 represents a base station; UE 802 represents a Tx UE, while UE 804 and UE 805 represent Rx UEs for unicast transmissions, and UE 803 represent a Rx UE for a beamforming transmission from UE 802; and UE 806 represents a Tx UE, while UE 803 represents a Rx UE for a beamforming transmission from UE 806.

In some embodiments of the present application, the sidelink communication transmission implemented in the embodiments of FIG. 8 may solve Interference coordination issue or beam coordination issue. Specifically, if both UE 802 and UE 806 perform beamforming transmissions to UE 803 simultaneously, UE 803 should receive data from UE 802 and UE 806 at the same time with different RX beams, which may cause antenna gain of UE 803 to be reduced. Under this scenario, Interference coordination issue or beam coordination issue happens at UE 803. However, these issues may be solved using the embodiments illustrated in FIGS. 3-6, in which a BS knows global transmission information received from all UEs in a sidelink communication system (e.g., both UE 802 and UE 806), and schedules resource(s) for sidelink transmission(s) of each Tx UE in order.

For instance, BS 801 may firstly schedule resource(s) for beamforming transmission from UE 806 to UE 803, and secondly schedule resource(s) for beamforming transmission from UE 802 to UE 803. In other words, sidelink transmissions between UEs in a sidelink communication system are controlled by a BS in the sidelink communication system, and thus the Interference coordination issue or beam coordination issue is avoided.

Figure 9:
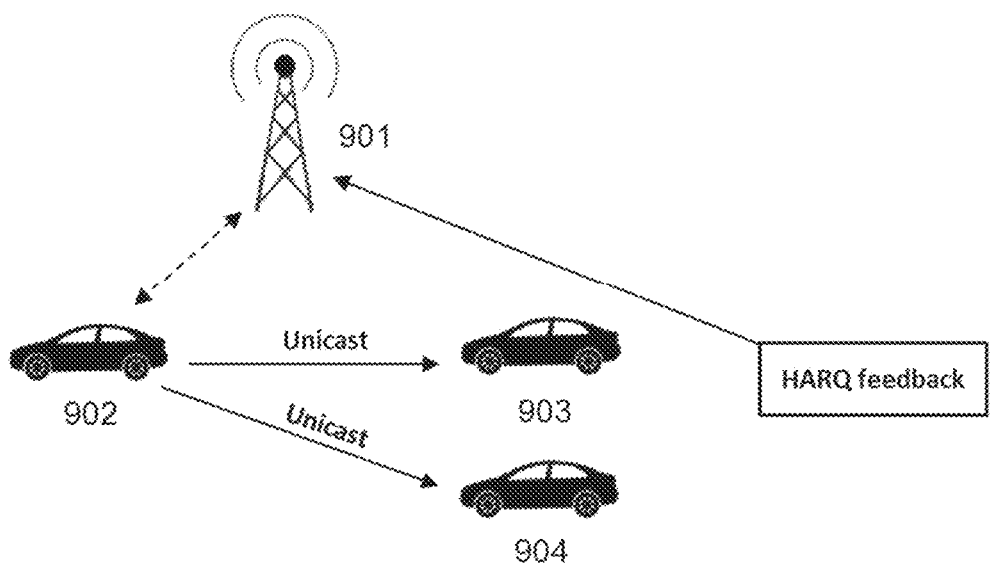
FIG. 9 illustrates another exemplary sidelink communication system in accordance with some embodiments of the present application.

FIG. 9 illustrates another exemplary sidelink communication system in accordance with some embodiments of the present application. Similar to FIGS. 1, 2, 7, and 8, the total number of BSs, the total number of UEs, and names of UEs (which represent a Tx UE or a Rx UE) shown in FIG. 9 may vary. According to the embodiments of FIG. 9, BS 901 represents a base station, UE 902 represents a Tx UE, and UE 903 and UE 904 represent Rx UEs for unicast transmissions.

In some embodiments of the present application, the sidelink communication transmission implemented in the embodiments of FIG. 9 may enable HARQ feedback without ambiguity. Specifically, after receiving unicast data from UE 902, if both UE 903 and UE 904 have the possibility to transmit HARQ feedback to BS 901, BS 901 possibly cannot determine from which UE the HARQ feedback is transmitted. However, this issue may be solved using the embodiments illustrated in FIGS. 3-6, in which a BS schedules resource(s) for each Rx UE in order, and thus knows that the HARQ feedback is transmitted from the Rx UE using the schedules resource(s). In other words, sidelink transmissions between UEs in a sidelink communication system are controlled by a BS in the sidelink communication system, and thus the BS knows the UE which will transmit HARQ feedback.

Figure 10:
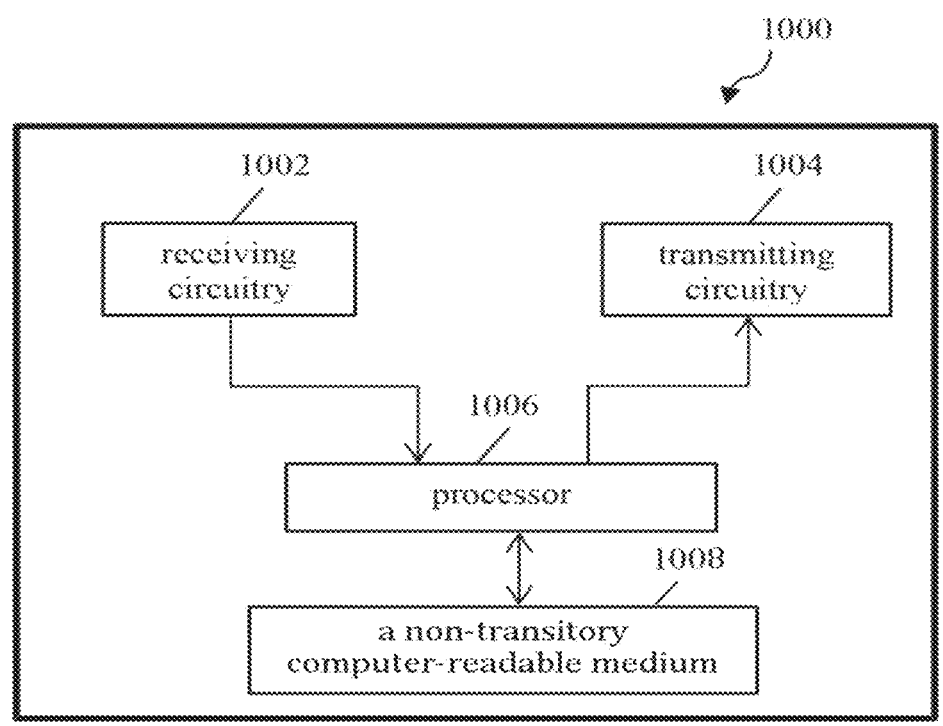
FIG. 10 illustrates a block diagram of an exemplary apparatus in accordance with some embodiments of the present application.

FIG. 10 illustrates a block diagram of an exemplary apparatus in accordance with some embodiments of the present application. Referring to FIG. 10, the apparatus 1000 includes a non-transitory computer-readable medium 1108, a receiving circuitry 1002, a transmitting circuitry 1004, and a processor 1006 coupled to the non-transitory computer-readable medium 1108, the receiving circuitry, and the transmitting circuitry. The apparatus 1000 may include a UE, a source UE, a member UE, a V2X UE or other device that supports D2D communication or sidelink transmission.

It is contemplated that some components are omitted in FIG. 10 for simplicity. In some embodiments, the receiving circuitry 1002 and the transmitting circuitry 1104 may be integrated into a single component (e.g., a transceiver).

In some embodiments, the non-transitory computer-readable medium 1008 may have stored thereon computer-executable instructions to cause a processor to implement the operations with respect to the UE(s) as described above. For example, the computer-executable instructions may be executed to cause the processor 1006 to control the receiving circuitry 1002 and transmitting circuitry 1004 to perform the operations with respect to the UE(s) as described and illustrated with respect to FIGS. 2-9.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method performed by a user equipment (UE), the method comprising:
   transmitting, to a base station, a request for one or more sidelink transmissions between the UE and one or more destinations;
   transmitting, to the base station, information comprising a quality of service of the one or more sidelink transmissions;
   receiving scheduling information from the base station, wherein the scheduling information is based on the quality of service of the one or more sidelink transmissions and comprises an indicator indicating a grant for a selected sidelink transmission between a destination among the one or more destinations and the UE, the indicator comprises an index corresponding to the destination, the index is mapped to a UE destination identifier (ID) or a group ID, and the scheduling information further comprises a resource which is scheduled for the UE to transmit data; and
   transmitting the data to the destination using the resource scheduled for the UE.

2. The method of claim 1, wherein the request comprises a list of identifiers of the one or more destinations of the one or more sidelink transmissions.

3. The method of claim 1, wherein the request comprises a buffer size report of the one or more sidelink transmissions.

4. The method of claim 3, wherein the buffer size report comprises a destination index, a logical channel group identifier, and a buffer size of each of the one or more sidelink transmissions.

5. The method of claim 1, wherein the scheduling information is carried in downlink control information.

6. The method of claim 1, wherein the index is used by the UE to retrieve identifier of the destination.

7. The method of claim 6, wherein the index is further used by the UE to retrieve identifying information of a session corresponding to the destination, wherein the session is at least one of a unicast session, a groupcast session, and a broadcast session.

8. The method of claim 6, wherein the identifier of the destination is retrieved by the UE from at least one of:
   a list of identifiers of the one or more destinations transmitted in the request, and
   a buffer size report transmitted in the request.

9. The method of claim 1, wherein the resource is a mini-slot for a sidelink transmission.

10. A method performed by a base station, the method comprising:
    receiving, from a user equipment (UE), a request for one or more sidelink transmissions between the UE and one or more destinations;
    receiving, from the UE, information comprising a quality of service of the one or more sidelink transmissions;
    selecting a sidelink transmission from the one or more sidelink transmissions, wherein the selected sidelink transmission is between a destination among the one or more destinations and the UE;
    determining scheduling information based on the quality of service of the one or more sidelink transmissions; and
    transmitting the scheduling information, wherein the scheduling information comprises an indicator indicating a grant for the selected sidelink transmission, the indicator comprises an index corresponding to the destination, the index is mapped to a UE destination identifier (ID) or a group ID, and the scheduling information further comprises a resource which is scheduled for the UE to transmit data.

11. The method of claim 10, wherein the request comprises a list of identifiers of the one or more destinations of the one or more sidelink transmissions.

12. The method of claim 10, wherein the request comprises a buffer size report of the one or more sidelink transmissions.

13. The method of claim 12, wherein the buffer size report comprises a destination index, a logical channel group identifier, and a buffer size of each of the one or more sidelink transmissions.

14. The method of claim 10, wherein the scheduling information is carried in downlink control information.

15. The method of claim 10, wherein the index is used by the UE to retrieve an identifier of the destination.

16. A user equipment (UE), comprising:
    at least one memory; and
    at least one processor coupled with the at least one memory and configured to cause the UE to:
       transmit, to a base station, a request for one or more sidelink transmissions between the UE and one or more destinations;
       transmit, to the base station, information comprising a quality of service of the one or more sidelink transmissions;
       receive scheduling information from the base station, wherein the scheduling information is based on the quality of service of the one or more sidelink transmissions and comprises an indicator indicating a grant for a selected sidelink transmission between a destination among the one or more destinations and the UE, the indicator comprises an index corresponding to the destination, the index is mapped to a UE destination identifier (ID) or a group ID, and the scheduling information further comprises a resource which is scheduled for the UE to transmit data; and
       transmit the data to the destination using the resource scheduled for the UE.

17. A base station, comprising:
    at least one memory; and
    at least one processor coupled with the at least one memory and configured to cause the base station to:

receive, from a user equipment (UE), a request for one or more sidelink transmissions between the UE and one or more destinations;

receive, from the UE, information comprising a quality of service of the one or more sidelink transmissions;

select a sidelink transmission from the one or more sidelink transmissions, wherein the selected sidelink transmission is between a destination among the one or more destinations and the UE;

determine scheduling information based on the quality of service of the one or more sidelink transmissions; and transmit the scheduling information, wherein the scheduling information comprises an indicator indicating a grant for the selected sidelink transmission, the indicator comprises an index corresponding to the destination, the index is mapped to a UE destination identifier (ID) or a group ID, and the scheduling information further comprises a resource which is scheduled for the UE to transmit data.

* * * * *